3,824,092
METHOD OF MANUFACTURING A SURFACE SOIL
Karl H. R. Wikstrom, 3 Taljstensvagen, 141 46 Huddinge, Sweden, and Per E. Ericson, 11 Plankvagen, 130 50 Vendelso, Sweden
No Drawing. Continuation of abandoned application Ser. No. 52,756, July 6, 1970. This application Dec. 11, 1972, Ser. No. 314,074
Claims priority, application Sweden, July 8, 1969, 9,638/69; Dec. 23, 1969, 17,858/69
Int. Cl. C09f 3/00
U.S. Cl. 71—12                      19 Claims

ABSTRACT OF THE DISCLOSURE

A method of manufacturing a surface soil wherein sludge from sedimentation tanks having a dry solids content of approximately 10–90% is mixed with a sandy material and then compacted by pressing. Alternatively this surface soil may contain peat soil in addition to the sandy material.

---

This is a continuation of application Ser. No. 52,756 filed July 6, 1970 now abandoned.

The present invention relates to a method of manufacturing a surface soil or tilth and is mainly characterized in that sludge from sedimentation tanks having a dry solids content of aproximately 10–90% is mixed with a sandy material, whereafter the resultant mixture is compacted by pressing. According to an alternative embodiment of the invention, the surface soil is further characterized by the fact that it contains peat soil in addition to the sandy material.

The invention is, therefore, based on the use of sedimentation sludge, which, as is commonly known, is obtained from sewage systems in the form of approximately a 3–90% suspension of organic and inorganic substances in water from the sedimentation tanks of said system. It has been discovered that if the sludge is dewatered to a dry solids content of approximately 10–90% by weight and then mixed with a sandy soil, it can be utilized as a surface soil or tilth. The surface soil of the present invention is produced in two stages, the purpose of the first stage being to produce a pre-mix, in which the starting materials are present in the intended proportions, while in the second stage the pre-mix formed in the first stage is homogenized so as to transform the same to a product in which the particles of sand are enveloped by an organic substance. This effect is obtained by subjecting the pre-mix from the first stage to a pressing operating; it having been discovered that the dry product enters into intimate contact with the hydrophilic sandy material in spite of its hydrophobic nature. It would appear that one necessary condition is that the sludge has a dry solids content within the given limits and that the formed pre-mix is subjected to a pressing operation which is suitably extended to comprise a series of such pressing operations at a progressively increasing pressure, similar to the case in conventional metal rolling operations.

The sandy material may be chosen from a large number of different materials of an inorganic character, containing no, or preferably minor quantities of organic substances; the essential thing being that the material is not of uniform particle size. Thus, the size of the various particles may vary from close to zero mm. up to 20 mm., preferably from 0.5 to 8 mm. The material should have a density of 1000–2500 kg./m.³. Mo-clay, common sand and gravel are examples of the types of material envisaged as the sandy material used in the method of the present invention.

The pressing operation to which the pre-mix is subjected is of particular importance, since it is this which causes a satisfactory, homogeneous mixture of the sludge with the sandy material. The material can be pressed together, for example, in a tapering annular slot, in which it is progressively compressed whilst being subjected to a series of blows, which causes the coarser sand particles to be crushed to smaller sizes, these particles then being forced into the liquid phase of the sludge having a relatively high dry solids content.

Subsequent to be pressed together, the pre-mix can be suitably subjected to a loosening or expanding process, wherein the material is caused to fall freely onto a receiving surface, preferably comprising a treated material, where it is broken up into a porous, very loose product suitable for use as a surface soil and which can be readily spread on grassland or similar surfaces such as lawns for example. Because of the nature of the starting materials, one great advantage afforded by the product produced in accordance with the invention is that the product is free of seeds liable to produce weeds, thereby reducing to a very large extent the task of removing weeds from ground employing the surface soil of the invention. It has also been discovered that a lawn built on a surface comprising a top soil produced according to the present invention is surprisingly durable. The reason for this is that the roots of the grass become embedded in the surface of the surface soil in a manner whereby said surface is reinforced with the roots in a very effective manner. Furthermore, the ability of the surface soil of the present invention to retain water is extremely high.

In accordance with a further development of the present invention, the surface soil comprising a mixture of 10–90% dry content sludge and a sandy material can be modified by adding to said mixture a peat soil. One example of the many different varieties of peat soil naturally available is peat moss.

Thus, in accordance with the further development of the invention, there is provided a surface soil or tilth comprising a mixture of sedimentation sludge having a dry solids content of 10–90% by weight, a sandy material and a peat soil.

In accordance with a variation on the aforedescribed method, the quantity of peat soil used is selected so as to comprise 5–80% by weight of said mixture. In accordance with a further variation on said method the quantity of peat soil is selected, so that the content of peat soil in the mixture is between 10 and 40% by weight.

For the purpose of increasing the nutrient value of the surface soil of the present invention, the mixture may be added with a quantity of fertilizing agent containing nitrogen, potassium and/or phosphorus. The content of fertilizer in the mixture can be varied within wide limits and the total quantity of fertilizer may reach from 1–50% by weight, although a total content of from 1–30% by weight is preferred.

In accordance with another embodiment of the invention, the sedimentation sludge, either in mixture with the sandy material or separately, may be subjected to a period of storage prior to being pressed. It has been found possible to obtain in this way an equilibrium with regard to water between the constituents of the mixture, which equilibrium is to advantage when effecting the pressing operation. The mixture of sludge and peat soil can be stored for long periods, although normally at least one hour is required in order to obtain the intended result. There is nothing, however, to prevent the mixture from being stored for a period as long as six months.

According to a modification of the method of the invention, the sandy material is substituted with a similar, naturally available substance such as moraine and/or a clay substance. It has been found to advantage to add unslaked lime to the mixture, for the purpose of breaking down parasites and to provide other effects.

According to an embodiment of the invention, a content of finely divided household refuses may be imparted to the surface soil, said content being possible to vary from 2 to 80 percent by weight on the whole composition. The screen analysis of the refuses may be from 0 to 90 mm.

According to still further an embodiment of the invention, a content of latrine may be imparted to the surface soil, said latrine being in admixture with peat. The percentage of latrine and peat in combination may be varied from 2 to 60 percent.

The invention will now be described by way of two examples.

EXAMPLE 1

Sedimentation sludge having dry solids content of approximately 10% was dewatered to a dry solids content of 25%. 100 kg. of the dewatered sedimentation sludge were mixed with 100 kg. of sand, having a specific gravity of 1.4 and a screen analysis of 0–6 mm., to form a pre-mix. The pre-mix was then subjected to a series of rapid pressing operations. The resulting product was then lifted and allowed to fall freely onto a receiving surface and then placed in storage.

EXAMPLE 2

Sedimentation sludge having a dry solids content of approximately 10% was dewatered to a dry solids content of 30%. 35 kg. of the dewatered sludge were mixed with 35 kg. of a clay material (fraction 0–2 mm.), 28 kg. of peat soil and 2 kg. of a fertilizer, containing nitrogen, phosphorus and potassium and calcium and magnesium in the form of compounds, to form a pre-mix. The pre-mix was stored for two months and then subjected to a series of rapid press operations. The resultant product was found to be an excellent surface soil for lawn laying purposes. A better result was obtained with a product produced according to the aforefoing but which had been caused to fall freely onto a receiving surface and then stored for a short period.

In both cases, the soil was found to be extremely durable and the surface layer, subsequent to being sewn with grass seed, was found to be well reinforced with the grass roots.

What we claim is:

1. A method of producing a surface soil which comprises:
   (A) mixing sedimentation sludge having a dry solids content of 25% to 35% with
   (B) a sandy material of inorganic character containing not more than minor quantities of organic substances and having a non-uniform particle size having a density of 1000–2500 kg./cm.$^3$ wherein said sandy material is selected from the group consisting of sand, gravel, clay substances, moraine and mixtures thereof; and wherein the particle size is up to 20 mm.;
   (C) the sludge and sandy material being mixed in a 1:1 weight ratio;
   (D) adding peat soil to the sludge and sandy material mixture; and wherein the amount of peat soil in the resultant mixture is between 10 and 40% by weight;
   (E) adding a fertilizing agent containing nitrogen, potassium, phosphorus or mixtures thereof;
   (F) storing the mixture until equilibrium is obtained between the peat soil and sedimentation sludge;
   (G) then after said equilibrium is obtained, subjecting the resultant mixture to a series of pressing operations at progressively increasing pressures of such a nature that the particles of the sandy material will be enveloped by the sludge;
   (H) treating the material to crush the coarser sandy material at the same time as it is being pressed; and
   (I) then the pressed material is caused to fall freely in a manner whereby it obtains a porous and loose structure.

2. A method for producing a surface soil which comprises:
   (A) mixing sedimentation sludge having a dry solids content of 10–90% by weight with
   (B) a sandy material of inorganic character containing not more than minor quantities of organic substances and having a non-uniform particle size of up to 20 mm.; and
   (C) then subjecting the resultant mixture to a series of pressing operations at progressively increasing pressures of such a nature that the particles of the sandy material will be enveloped by the sludge into a compacted mass.

3. A method according to claim 2 wherein the sandy material has a density of 1000–2500 kg./cm.$^3$.

4. A method according to claim 2 wherein the pressed material is caused to fall freely in a manner whereby it obtains a porous and loose structure.

5. A method according to claim 2 wherein the material is treated to crush the coarser sand material at the same time as it is being pressed.

6. A method according to claim 2 wherein peat soil is added to the sludge and sandy soil mixture before the pressing operation.

7. A method according to claim 6 wherein the amount of peat soil in the resultant mixture is between 5 and 80% by weight.

8. A method according to claim 7 wherein the amount of peat soil in the resultant mixture is between 10 and 40% by weight.

9. A method according to claim 2 wherein a fertilizing agent containing nitrogen, potassium phosphorus or mixtures thereof is added to the mixture.

10. The method of claim 2 wherein said sandy material is selected from the group consisting of sand, gravel, clay substances, moraine and mixtures thereof.

11. The method of claim 2 wherein said sandy material is clay.

12. The method of claim 6 which further comprises storing the mixture of sedimentation sludge and peat soil prior to the pressing operation.

13. The method of claim 12 wherein said storing is continued until equilibrium is obtained between the peat soil and sedimentation sludge.

14. The method of claim 2 wherein said sandy material is sand.

15. The method of claim 2 wherein said sludge has a dry solids content of 25% or 35%.

16. The method of claim 2 wherein the sludge and sandy material are mixed in a 1:1 weight ratio.

17. The method of claim 2 wherein a fertilizing agent containing at least one of the elements from the group consisting of nitrogen, potassium and phosphorus is added to the mixture and wherein the pressed material is caused to fall freely in a manner whereby it obtains a porous and loose structure.

18. A method according to claim 17 wherein peat soil is added to the mixture of sludge, sandy soil and fertilizing agent.

19. A method according to claim 18 wherein the mixture is stored prior to being pressed.

References Cited

UNITED STATES PATENTS 2,797,985    7/1957    Larson _____ 71—8
2,977,214    3/1961    McLellan _____ 71—12 X SAMIH N. ZAHARNA, Primary Examiner R. BARNES, Assistant Examiner U.S. Cl. X.R.

71—13, 24, 64 G